United States Patent [19]

Hunt

[11] Patent Number: 5,052,511

[45] Date of Patent: Oct. 1, 1991

[54] AUTOMATIC RETURN MECHANISM FOR HYDROSTATIC TRANSMISSION PRESSURE RELEASE VALVE

[75] Inventor: Kenneth E. Hunt, Oconomowoc, Wis.

[73] Assignee: Deere & Company, Moline, Ill.

[21] Appl. No.: 554,213

[22] Filed: Jul. 17, 1990

[51] Int. Cl.$^5$ .............................. B60K 17/00
[52] U.S. Cl. .................... 180/305; 180/306; 180/307; 60/464
[58] Field of Search .............. 180/305, 306, 307, 367; 60/399, 464, 468, 488, 499

[56] References Cited

U.S. PATENT DOCUMENTS 3,360,933  1/1968  Swanson et al. ............... 60/464
3,376,703  4/1968  Buczynski ....................... 60/399

Primary Examiner—Andres Kashnikow
Assistant Examiner—Richard Camby

[57] ABSTRACT

A hydrostatic transmission pressure release valve control mechanism is provided to enable an operator to quickly release the transmission pressure and manually move the vehicle when the engine is not operating. The pressure release mechanism, which permits vehicle movement for repairs, maintenance and similar activities, is automatically deactivated to restore transmission pressure as the vehicle brake is depressed in preparation for restarting the engine.

6 Claims, 2 Drawing Sheets

AUTOMATIC RETURN MECHANISM FOR HYDROSTATIC TRANSMISSION PRESSURE RELEASE VALVE

FIELD OF THE INVENTION

The present invention relates to small vehicles having hydrostatic transmissions such as lawn and garden tractors. Specifically, the invention provides for a hydrostatic transmission fluid pressure release valve control mechanism for allowing the vehicle, when the engine is not operating, to be manually pushed for maintenance or similar activities.

BACKGROUND OF THE INVENTION

Small vehicles such as lawn and garden tractors are commonly equipped with hydrostatic transmissions. The hydrostatic pump-motor circuits in these transmissions generally remain pressurized when the engine is not operating. Consequently, movement of the unpowered vehicle when routine maintenance and/or other repairs are to be performed is difficult since fluid flow through the pump is not possible without a line being provided to bypass the pump.

While it is common for lawn and garden-type vehicles with hydrostatic transmissions to provide hydrostatic fluid pressure release circuits and valve controls that allow the operator to manually move the vehicle for maintenance and other activities when the engine is not operating, the controls for opening and closing those circuits present problems.

One such vehicle, identified as the John Deere Model 300/400 Series Lawn and Garden Tractor, provides a hydrostatic fluid pressure release lever which is set and then locked in place by the operator. Should the operator fail to return the lever to its original position before restarting the engine, the hydrostatic fluid release valve will not permit the transmission to build up pressure, and accordingly, the transmission will have no forward or reverse speed. Once the engine is started and the pressure release control lever is returned to its original position, the tractor may lurch as hydrostatic pressure is restored.

A second type of hydrostatic fluid pressure release control is found on the 200 Series John Deere Model Lawn and Garden Tractors. Once the pressure release lever is activated on this vehicle, it remains in its released position. When the engine is subsequently started, the pump pressure in the hydrostatic transmission closes the pressure release valve, and the transmission functions normally. This type of release control system however requires a high charge pump pressure to close the hydrostatic fluid pressure release valve automatically and, of course, adds additional manufacturing and maintenance costs to the vehicle.

A third type of hydrostatic fluid pressure release control mechanism is found in the 100 Series John Deere Model Tractors. With this control, the operator depresses a fluid pressure release valve lever beneath his seat to release the fluid pressure. The lever has a spring return and therefore must be held in the released position during the entire time the tractor is being pushed. While this system overcomes the need for the operator to release the lever after manually moving the vehicle, it can be inconvenient because the operator must simultaneously hold the release lever in place, push the tractor and steer it at the same time.

SUMMARY OF THE INVENTION

Accordingly, there is provided herein a hydrostatic transmission pressure release valve control system which permits the operator to quickly release the pressure in the hydrostatic transmission to permit manual movement of the vehicle for repair, maintenance and/or similar activities and then automatically restores the pressure as the brake pedal is depressed to restart the engine.

This control system does not require a high pressure charge pump nor does it require that the operator hold the pressure release valve lever in place or manually return it to its original position before restarting the engine.

The pressure release valve control of the present invention allows the operator to release the hydrostatic transmission pressure by simply shifting a control lever beneath his seat. Subsequently, when the brake pedal is depressed to deactivate the engine electrical interlock before restarting the engine, a mechanical linkage between the brake pedal and pressure release valve closes the valve to restore hydrostatic fluid pressure to the transmission.

In the preferred embodiment, the pressure release valve means includes a pair of ball check valves provided in a fluid line which interconnects the high and low pressure fluid lines that form a loop between the hydrostatic pump and motor. The check balls are mechanically unseated by a pair of control levers which are then held in place by a detent means. Once the check balls are unseated, the hydrostatic fluid can be circulated in a loop through the interconnecting line and the motor as the vehicle is manually pushed. With the hydrostatic pressure relieved, the transmission will not retard rotation of the vehicle drive wheels and it can be easily moved for maintenance, repairs, loading and/or similar activities.

The detent means is automatically deactivated when the operator depresses the brake pedal in preparation for restarting the vehicle. As the brake pedal is depressed to deactivate the engine electrical interlock, a linkage between the pedal and the control levers causes the detent means to be released and the control levers to be shifted out of contact with the check balls. As the check balls reseat and the engine is started, hydrostatic fluid flow between the transmission pump and motor is re-established and the operator can proceed to drive the vehicle in forward or reverse as desired.

DESCRIPTION OF THE PREFERRED EMBODIMENT

Figure 1:
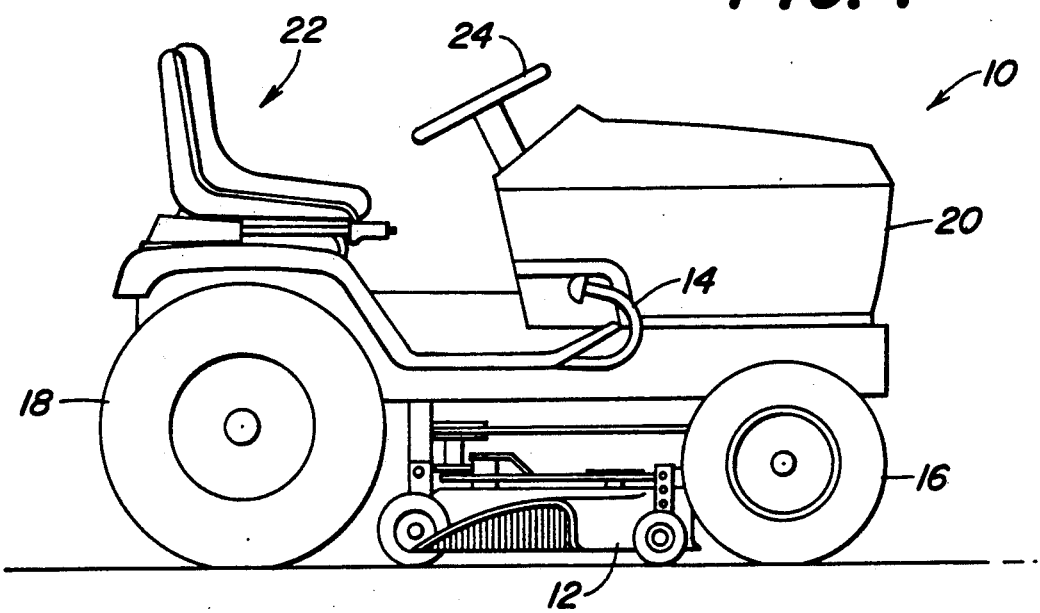
FIG. 1 illustrates a lawn and garden tractor equipped with the present invention.

Looking first to Fig. 1, there is illustrated a typical lawn and garden tractor 10 having a mower 12 mounted therebeneath. The tractor 10 is equipped with a brake pedal 14, front and rear wheels 16 and 18, the rear wheels 18 being equipped with brakes (not shown). The tractor 10 is further equipped with an engine beneath the cowling 20, an operator's station 22, and a steering wheel 24.

Figure 2:
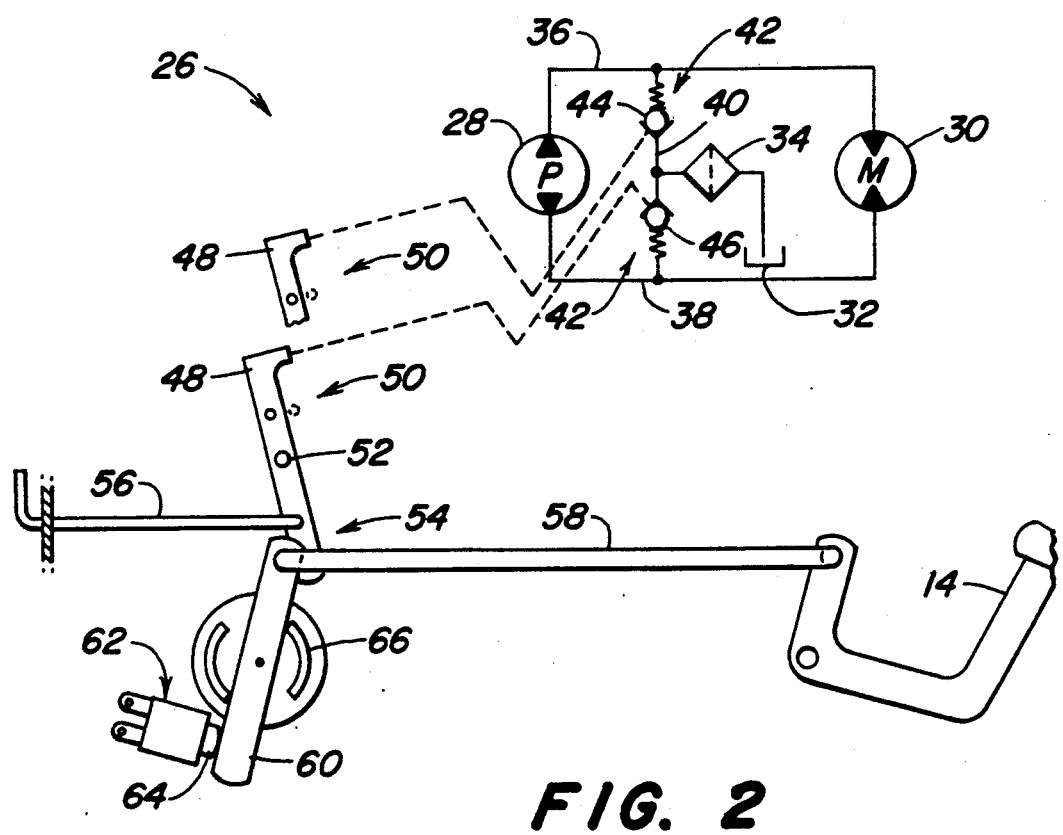
FIG. 2 illustrates a partial schematic view of the control linkage for activating the hydrostatic transmission fluid pressure bypass valve.

Illustrated schematically in FIG. 2 is the transmission hydrostatic fluid pressure release valve control mechanism 26. In this embodiment, the transmission includes a pump 28 and motor 30 as illustrated. A supply of fluid is provided in the reservoir 32 which supplies, through an inlet filter 34, first and second pressure lines 36 and 38 which interconnect the pump 28 and motor 30. The pump 28 is bi-directional as is the motor 30, allowing it to move hydrostatic fluid through either line 36 or 38 and receive it from either line 36 or 38.

A bypass line 40 is provided between the first and second pressure lines 36 and 38. Provided in the bypass line 40 are bypass valve means 42, composed in the preferred embodiment of check valves. Other bypass means such as a spool valve could also be utilized and the invention is not intended to be limited to the use of check valves. The check valve balls 44 and 46, are shiftable between closed and open or first and second positions for respectively blocking and permitting flow of hydrostatic fluid through the bypass valve means 42. To shift the check balls 44 and 46 between their seated and unseated positions is a pair of valve control means or lever arms 48.

Figure 3:
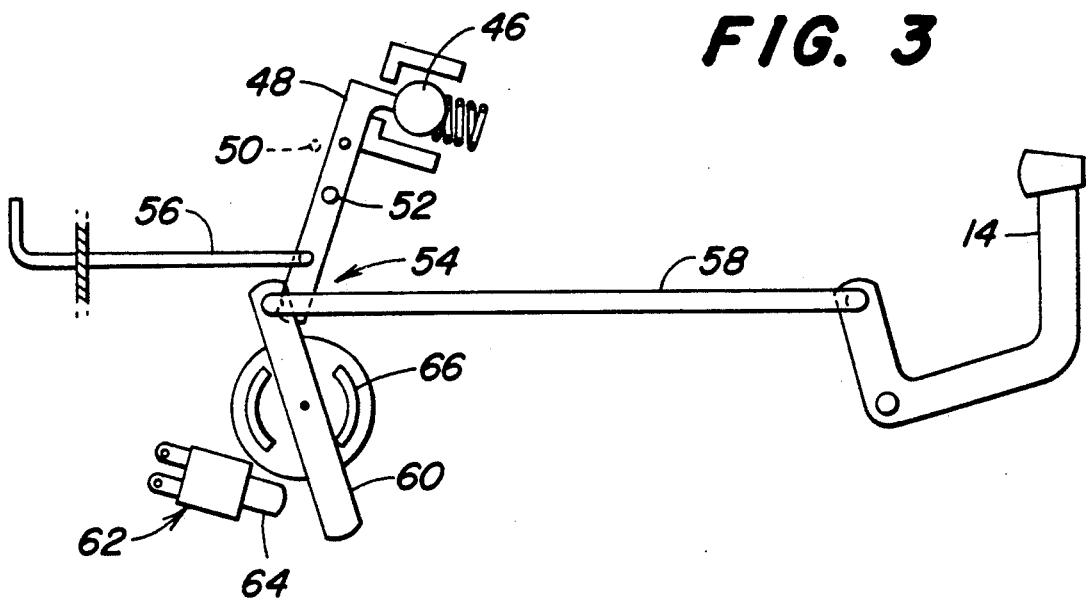
FIG. 3 illustrates a partial schematic view of the bypass valve control mechanism with the valve check balls unseated.

The control means or lever arms 48 cooperate with a detent means designated by the numeral 50. The detent means 50 serves to hold the lever arms 48 in place once activated to maintain the ball valve means 42 in their open positions, as shown in FIG. 3. Any detent mechanism which would serve to hold the lever arms 48 in place could be utilized, such as a spring loaded ball receivable in a recess carried in the lever arms 48.

The lever arms 48 are pivotally supported at 52 for swinging movement and coupled at their ends 54 to a hand activated lever 56 which can be shifted by the operator. The hand lever 56 and control lever arms 48 are operatively coupled with a brake means. The brake means includes the control rod 58 which is connected to the brake pedal 14 carried on the vehicle 10. As the brake pedal 14 is actuated, the control rod 58 is pulled to the right as viewed in FIG. 2, swinging the lever arms 48 counterclockwise and disengaging the detent means 50 to move the lever arms 48 out of contact with the check balls 46.

The control rod 58 is in turn connected through the brake link 60 to an electrical interlock means 62. The electrical interlock means 62 takes the form in the present invention of an electrical circuit interrupter, that circuit being completed (see FIG. 2) as the brake link 60 makes contact with a switch 64 to permit electrical current to flow from the battery to the engine.

The operation of the hydrostatic fluid pressure release valve control system will now be reviewed.

When an operator wants to perform maintenance on his vehicle or move the vehicle around the shop without the engine being powered, he will first turn the engine off. The pressure release control mechanism will be in the configuration illustrated in FIG. 2. Once the engine has died, he will pull the hand lever 56 to rotate the valve control lever arms 48 to the position illustrated in FIG. 3. The control lever arms 48 will contact the check balls 44 and 46, depress them and permit fluid in the transmission to circulate through the lines 36 and 38 to the motor 30. Since the fluid will then be able to move through the motor 30 and lines under low pressure, the pump 28 will not provide resistance to rotation of the drive wheels 18 as the operator moves the vehicle 10.

Figure 5:
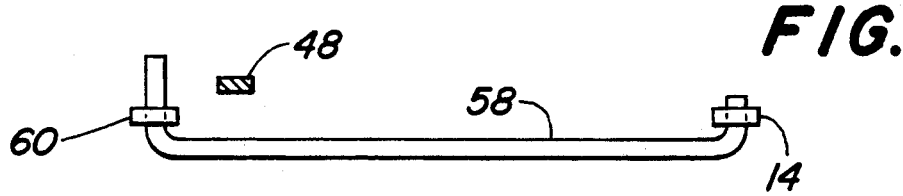
FIG. 5 illustrates a partial plan view of the control linkage taken along lines 5—5 of FIG. 4.
Figure 4:
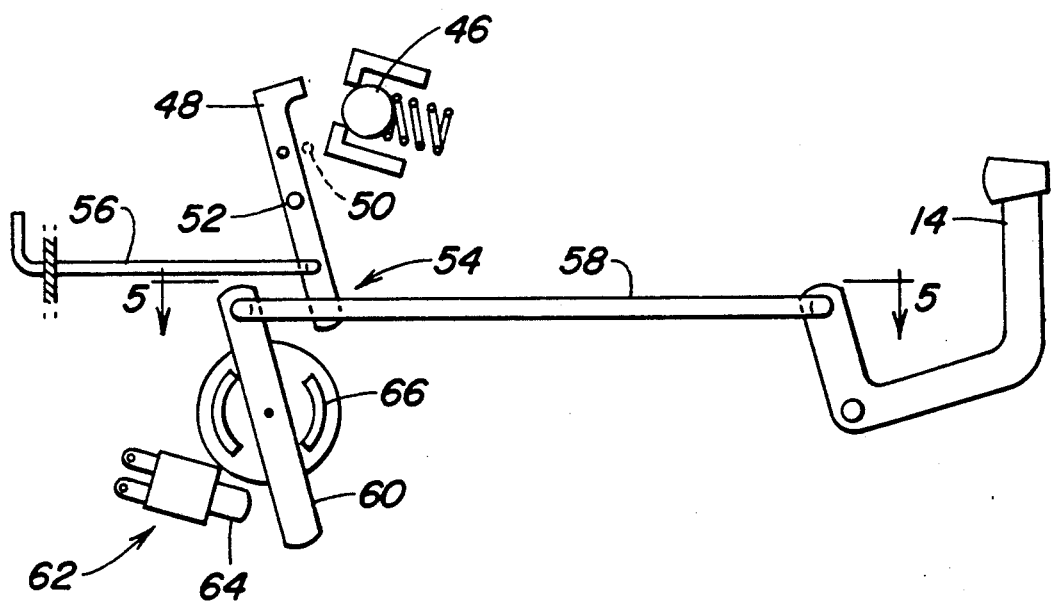
FIG. 4 illustrates a partial schematic view of the bypass valve control mechanism with the brake pedal released, the engine electrical interlock deactivated and the valve check balls reseated.

When the operator has finished with the activity related to servicing or maintaining the vehicle and wants to start the engine again, he will depress the brake pedal 14 to apply the wheel brakes. The brake pedal 14, which is connected to the control rod 58 and link 60, will shift them to the right as viewed in FIG. 2. As the link 60 is swung to the right, it applies the wheel brakes 66 and through contact with the electrical interrupter circuit 62, completes the circuit between the battery and engine. Accordingly, the engine can then be started with this safety feature. Simultaneously, the control rod 58 will swing into contact with the control levers 48 (see FIGS. 2, 4 and 5) and urge them counterclockwise, as viewed in FIG. 2. The force of the control rod 58 on the lever arms 48 disengages the detent means 50 and moves the lever arms 48 out of contact with the check balls 44 and 46, thereby allowing them to reseat and the interconnecting line 40 to be blocked. As the check balls 44 and 46 reseat, fluid is forced to follow the loop through the pump 28 and motor 30, and the pressure will be restored to the lines 36 and 38 as the engine is started.

Accordingly, the operator does not have to remember that the hydrostatic fluid pressure release valve control lever 56 must be shifted when he starts the engine to continue his work, since it will automatically be released as the operator depresses the brake pedal 14 to start the engine.

With the present invention, there is provided a simple and positive mechanism for relieving pressure inside the hydrostatic transmission and permitting easy and manual movement of the vehicle as may occasionally be desired. There is further provided a system whereby the transmission's hydrostatic fluid pressure is restored to its normal pressurized state as the operator starts the vehicle in preparation for further activities.

I claim:

1. In a vehicle having an engine and drive wheels with brakes, the improvement comprising:
   hydrostatic transmission means including
      pump means coupled to a motor means by first and second pressure return lines;
      a hydrostatic fluid supply for said lines;
      a bypass line having bypass valve means interconnecting the pressure return lines,
      said valve means being shiftable between first and second positions for respectively blocking or permitting flow of hydrostatic fluid through the valve means;
   valve control means shiftable between first and second positions and effective to respectively shift the bypass valve means between its first and second positions;
   detent means operatively coupled with the valve control means and moveable between first and second positions, said detent means when in its first position being effective to retain the valve control means in its second position, and the bypass valve means in its second position wherein fluid flow through the bypass valve means is permitted; and brake means interconnected with the wheel brakes and the valve control means for moving the detent means to its first position as the wheel brakes are applied.

2. The invention defined in claim 1 wherein the bypass valve means is provided with means biasing it toward its first position.

3. The invention defined in claim 1 wherein the valve control means includes a hand lever mounted on the vehicle and coupled with the bypass valve means, said lever being shiftable between a first and second positions wherein the bypass valve means respectively is moved to its first and second positions.

4. The invention defined in claim 3 wherein the valve control means includes a lever arm, and the detent means includes a first member biased toward engagement with a recess in the lever arm.

5. The invention defined in claim 1 wherein the brake means includes a brake pedal coupled with the detent means, the pedal when depressed being effective to shift the detent means from its second to its first position.

6. The invention defined in claim 5 wherein there is further provided an engine interlock means coupled with the engine and brake pedal, the interlock means being negated when activated by depression of the brake pedal to permit the engine to start.

* * * * *